US007652809B2

(12) United States Patent
Waldman et al.

(10) Patent No.: US 7,652,809 B2
(45) Date of Patent: Jan. 26, 2010

(54) METHOD AND APPARATUS FOR PHASE-ENCODED HOMOGENIZED FOURIER TRANSFORM HOLOGRAPHIC DATA STORAGE AND RECOVERY

(75) Inventors: David A. Waldman, Concord, MA (US); Joby Joseph, New Delhi (IN)

(73) Assignee: STX Aprilis, Inc., Maynard, MA (US)

( * ) Notice: Subject to any disclaimer, the term of this patent is extended or adjusted under 35 U.S.C. 154(b) by 0 days.

(21) Appl. No.: 12/217,755

(22) Filed: Jul. 8, 2008

(65) Prior Publication Data

US 2009/0021815 A1 Jan. 22, 2009

Related U.S. Application Data

(62) Division of application No. 10/962,202, filed on Oct. 8, 2004, now Pat. No. 7,411,708.

(60) Provisional application No. 60/532,795, filed on Dec. 24, 2003, provisional application No. 60/509,983, filed on Oct. 8, 2003.

(51) Int. Cl.
  *G03H 1/16* (2006.01)
(52) U.S. Cl. ............... 359/29; 359/11; 359/24
(58) Field of Classification Search ............ 359/10, 359/11, 24, 29
  See application file for complete search history.

(56) References Cited

U.S. PATENT DOCUMENTS

| 5,638,193 | A | 6/1997 | Trisnadi et al. |
| 5,703,705 | A * | 12/1997 | Curtis et al. ........ 359/22 |
| 5,877,873 | A | 3/1999 | Bashaw et al. |
| 6,072,608 | A | 6/2000 | Psaltis et al. |
| 6,108,110 | A | 8/2000 | Orlov et al. |
| 6,205,107 | B1 | 3/2001 | Burr |
| 6,414,763 | B1 | 7/2002 | Hesselink et al. |
| 6,721,076 | B2 | 4/2004 | King et al. |
| 6,842,285 | B2 | 1/2005 | Gluckstad |
| 7,065,032 | B2 | 6/2006 | Horimai |
| 2003/0039001 | A1 | 2/2003 | King et al. |
| 2003/0076765 | A1 | 4/2003 | Ayres et al. |

FOREIGN PATENT DOCUMENTS

EP  1 306 732  5/2003

OTHER PUBLICATIONS

Ashley, J., "Holographic Data Storage," IBM J. Res. Develop., 44(3):341-368 (May 2000).

(Continued)

*Primary Examiner*—Alessandro Amari
(74) *Attorney, Agent, or Firm*—Hamilton, Brook, Smith & Reynolds, P.C.

(57) ABSTRACT

An apparatus for writing and reading holograms, comprising a spatial light modulator (SLM) operable in phase mode, having a plurality of pixels for generating an object beam that overlaps with a reference beam; a holographic recording medium (HRM) in the path of the object beam; and a first lens element disposed in the path of the object beam between the SLM and the HRM; wherein the HRM is disposed at or near the Fourier transform plane of the first lens element.

13 Claims, 11 Drawing Sheets

OTHER PUBLICATIONS

Ballard, G.S., "Double-Exposure Holographic Interferometry with Separate Reference Beams," [retrieved on Sep. 12, 2005]. Retrieved from the Internet <URL:http://www.jap.aip.org/jap/copyright.jsp>.

Burckhardt, C.B., "Use of a Random Phase Mask for the Recording of Fourier Transform Holograms of Data Masks," Applied Optics, 9(3):695-700 (Mar. 1970).

Goldmann, G., "Recording of Digital Data Masks in Quazi Fourier Holograms," OPTIK, 34(3):254-267 (1971).

Joseph, J. et al., "Phase SLM Based Homogenized FT Holographic Storage and a Novel Technique for Recovery of Data from Phase Image," Frontiers in Optics, OSI Annual Meeting, Oct. 5-9, 2003.

\* cited by examiner

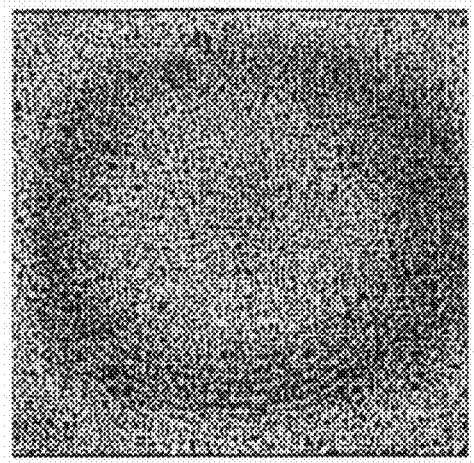
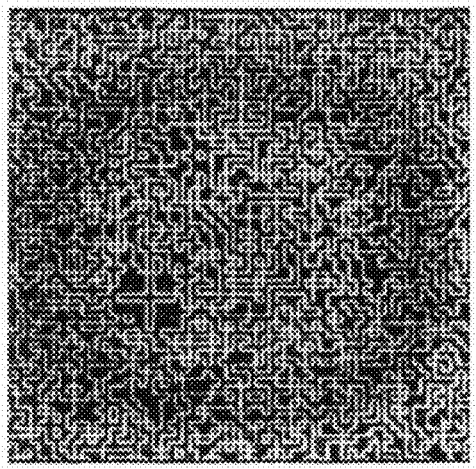
FIG. 10A FIG. 10B
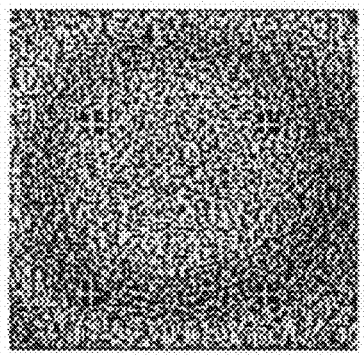
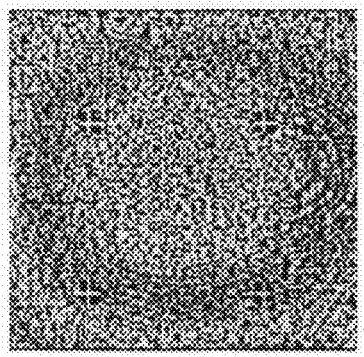
FIG. 11A FIG. 11B
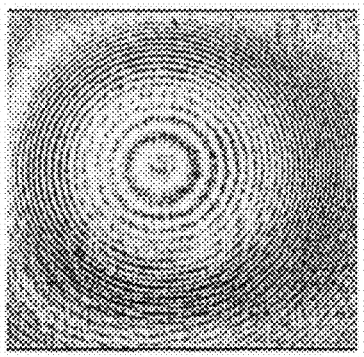
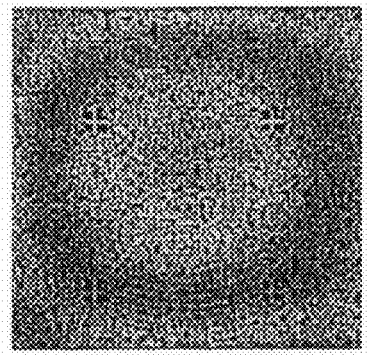
FIG. 11C FIG. 11D

US 7,652,809 B2

METHOD AND APPARATUS FOR PHASE-ENCODED HOMOGENIZED FOURIER TRANSFORM HOLOGRAPHIC DATA STORAGE AND RECOVERY

RELATED APPLICATIONS

This application is a divisional of U.S. patent application Ser. No. 10/962,202, now U.S. Pat. No. 7,411,708, filed Oct. 8, 2004, which claims the benefit of U.S. Provisional Application No. 60/532,795, filed on Dec. 24, 2003 and U.S. Provisional Application No. 60/509,983, filed on Oct. 8, 2003. The entire teachings of the above applications are incorporated herein by reference.

BACKGROUND OF THE INVENTION

One important potential use of volume holograms is in digital data storage. The three dimensional nature of a volume hologram, which refers to the storage of each bit as a hologram extending throughout the entire volume of the recording medium, renders volume holograms suitable for use in high capacity digital data storage. A group of bits can be encoded and decoded together as a two dimensional array of bits referred to as a page.

In Holographic Data Storage (HDS) systems the optics configuration used for recording and reading typically comprises a Fourier Transform (FT) geometry that uses a 4f optical imaging system which for recording includes a spatial light modulator (SLM) or other optical encoding device that displays information.

Mutually coherent object and reference beams form an interference pattern in the volume of their overlap. A hologram is recorded when light-induced changes in the volume of their overlap in the storage medium, such as photopolymerization, produce a record of the resulting interference pattern. The essential elements and arrangement of the 4f optical design for recording holograms are: an SLM that encodes the object beam, a lens element L1, having an effective focal distance f1 and which is located at a distance f1 from the SLM in the optical path of the encoded object beam, for relaying a 2-D Fourier transform of the spatial pattern of the encoded object beam to a plane that is one focal distance from the lens and a holographic recording medium (HRM), located at a distance f1 from the lens element L1 in the optical path of the encoded object beam relayed by the lens element L1.

Reconstruction of a hologram is accomplished by firstly illuminating the hologram with a reference beam that is substantially the same as the reference beam used for recording the hologram, and secondly imaging the resultant diffracted light (reconstructed object beam) onto the detector array with a second lens element of the said. 4f optical design. The following elements are used for reading a reconstructed hologram: a lens element L2 for relaying an object beam reconstructed by directing a reference beam at a storage location in the HRM, having an effective focal distance f2 and which is located at a distance f2 from the HRM in the optical path of a reconstructed object beam; and a light detector, located at a distance f2 from the lens element L2 in the optical path of the reconstructed object beam directed by lens element L2. In the aforementioned 4f optical design f1=f2, but in other optical configurations it may be advantageous for f2>f1 and thereby improve SNR of the reconstructed holograms by use of an optical relay system. Additionally, when magnification or demangnification is preferred in the optical configuration then f2 is not equal to f1.

Typically, an SLM operates in an amplitude mode, whereby the date page appears as a two-dimensional array of dark and bright pixels. When the Fourier transform (FT) of such an amplitude-modulated data page is obtained using a lens element L1, a strong high intensity direct current (DC) spike, that corresponds to the $0^{th}$ order diffraction, appears at the center of the Fourier transform at the Fourier plane (focal plane) due to the constructive interference of the light from the SLM pixels in the bright state. When large numbers of holograms are multiplexed in the medium, co-locationally or substantially overlapped, this intense DC peak will quickly saturate the dynamic range of a recording material (i.e. deplete the available photopolymerizable component), preventing the efficient use of the medium, and, additionally, will result in significant non-uniformity in the modulation depth of the recording for spatial frequencies of the interference pattern of the holographic recording corresponding to the DC and "alternative current" (AC) components of the FT, and thereby cause poor fidelity in the reconstructed data pages. The intense DC peak at the center and the typically large amplitude distribution in the AC components of the FT spectrum can also result in nonlinear grating formation, increasing the noise level in the reconstructed data page.

SUMMARY OF THE INVENTION

The instant invention relates to methods and apparati that can be used for recording and retrieving phase-encoded Fourier transform and fractional Fourier transform holograms.

In one embodiment, the present invention is an apparatus for writing and reading holograms comprising a spatial light modulator (SLM) operable in phase mode, having a plurality of pixels, each for generating an object beam that overlaps with a reference beam; a holographic recording medium (HRM) in the path of the object beam; and a first lens element disposed in the path of the object beam between the SLM and the HRM. The HRM is disposed at or near the Fourier transform plane of the first lens element.

In another embodiment, the present invention is a method of recording a homogenized hologram, comprising illuminating a spatial light modulator (SLM) operable in phase mode, said SLM having a plurality of pixels, each pixel of the SLM being in either a first state or a second state; controllably changing the state of selected pixels of the SLM, thereby changing the polarization of a light wavefront reflected from or transmitted through each pixel of the SLM, thereby forming an output beam; directing the output beam at a polarization filter, thereby changing the phase of a light wavefront reflected from or transmitted through each pixel of the SLM by φ, depending on the state of the pixel, and thereby producing a phase encoded object beam; directing the phase encoded object beam through a first lens element disposed in the path of the object beam between the SLM and a holographic recording medium (HRM), wherein the HRM is disposed at or near the Fourier transform plane of the first lens element; and directing a reference beam at the HRM so as to overlap the reference beam and the phase encoded object beam at a selected storage location in the HRM, thereby producing an interference pattern at the HRM and recording a hologram.

In another embodiment, the present invention is a method of reading a phase-encoded holograms comprising directing a reference beam at a location in a holographic recording medium where a phase-encoded Fourier transform hologram or fractional Fourier transform hologram was recorded, thereby reconstructing said phase-encoded hologram, said reconstructed hologram comprising images of edges of pixels, said images corresponding to transitions between pixels recorded by light wavefronts having different phases; detecting the reconstructed hologram by a detector having resolution sufficient to detect the edges of pixels; and assigning a value of "0" or "1" to each pixel based on the images of the edges of pixels, said images corresponding to transitions between pixels recorded by light wavefronts having different phases.

In another embodiment, the present invention is a method of reading holograms, comprising directing a reference beam at a selected location in a holographic recording medium where a phase-encoded Fourier transform hologram or fractional Fourier transform hologram was recorded, reconstructing a first object beam and directing the first object beam to a detector; illuminating a phase spatial light modulator (SLM) displaying a uniform data page, thereby forming a second object beam and directing the second object beam to said detector, thereby producing an interference pattern between the first object beam and the second object beam at the detector that reproduces an amplitude-modulated data page; and detecting the amplitude-modulated data page.

In another embodiment, the present invention is a method of recording a homogenized hologram, comprising recording a uniform data page hologram; and recording a Fourier transform hologram or a fractional Fourier transform hologram at the same storage location.

In another embodiment, the present invention is a method of reading a homogenized hologram, comprising directing a reference beam at a selected location in a holographic recording medium where a phase modulated Fourier transform hologram or fractional Fourier transform hologram and a uniform phase-encoded data page hologram were recorded using the same reference beam, thereby reconstructing a first object beam, used to record a first homogenized hologram, and a second object beam, used to record the uniform data page hologram, thereby producing an interference pattern between the first and second object beams that reproduces an amplitude-modulated data page; and detecting the amplitude-modulated data page with a light detector.

In another embodiment, the present invention is a method of reading a homogenized hologram, comprising directing a first reference beam at a selected location in a holographic recording medium where a phase-encoded Fourier transform hologram or fractional Fourier transform hologram and a uniform phase-encoded data page hologram were recorded using the first and a second reference beams, thereby reconstructing a first object beam used to record a first phase-encoded Fourier transform hologram or fractional Fourier transform hologram; directing the second reference beam at the selected storage location in the holographic recording medium, thereby reconstructing a second object beam used to record the uniform data page, thereby producing an interference pattern between the first and second object beams that reproduces an amplitude-modulated data page; and detecting the said amplitude-modulated data page with a light detector.

In another embodiment, the present invention is a method of searching a holographic recording medium for a specified content, comprising illuminating a spatial light modulator (SLM) displaying at least one search pattern corresponding to a selected content, thereby forming a search beam; directing the search beam to one or more storage locations on a holographic recording medium where at least one phase-encoded Fourier transform hologram or fractional Fourier transform hologram is recorded, thereby producing at least one reconstructed reference beam when the one or more storage locations contain at least one phase-encoded Fourier transform hologram or fractional Fourier transform hologram that contains selected content of the search pattern; and detecting the at least one said reconstructed reference beam with one or more light detectors.

In another embodiment, the present invention is a method of recording multiplexed holograms, comprising recording a first phase-encoded Fourier Transform hologram or a fractional FT hologram with a first reference beam; and recording a second phase-encoded Fourier Transform hologram or a fractional FT hologram with a second reference beam at the same location or at a substantially overlapped location on a holographic recording medium, wherein the angle between the first and the second reference beams is less than the angular separation between the primary diffraction peak and the first null of the Bragg angle selectivity curve of the first or the second holograms.

In another embodiment, the present invention is a method of recording multiplexed holograms, comprising recording a first phase-encoded Fourier Transform hologram or a fractional FT hologram with a first wavelength; and recording a second phase-encoded Fourier Transform hologram or a fractional FT hologram with a second wavelength at the same location or at a substantially overlapped location on a holographic recording medium, wherein the difference between the first and the second wavelengths is less than the wavelength separation between the primary diffraction peak and the first null of the Bragg wavelength selectivity curve of the first or the second holograms.

The instant invention is particularly useful for holographic data storage applications where the areal density of stored information exceeds about 16 Gbits/inch$^2$ and where use of content addressable memory is desirable. The invention can substantially increase the usable data density that can be stored in holographic media, such as relatively thin photopolymers, by firstly providing for recording with uniform modulation depth at the Fourier transform plane which improves the fidelity and efficiency of the recording and diminishes the requirements for laser power during recording, and, secondly, by providing for multiplexed holograms so that the angle, shift and/or wavelength increment between holograms is smaller than the corresponding increment of angle, shift or wavelength between the primary diffraction peak and first null of the Bragg selectivity of the multiplexed holograms. The invention substantially decreases cross-correlation in content addressable searching, and also increases the correlation signal strength that is obtained from content addressable searches when a small stored sub-image is to be identified and located within a larger stored image.

The present invention makes it possible for a full page or partial page content addressable searching to be performed directly on holograms recorded with data pages displayed in either amplitude or phase mode. The search method of the instant invention is substantially independent of the fidelity of the holographically recorded information. Another advantage of searching for data using a phase SLM is that it facilitates searching the holograms without causing cross-correlation that typically degrades the signal-to-nosie (SNR) of the search results and thereby improves discrimination of the search.

Another embodiment of the present invention facilitates edge enhanced reconstruction of the phase data pages recorded as holograms, by providing for detection of said edge enhanced features of the reconstructed phase data pages and/or providing for assignment of said features to, by way of example, binary "1" and "0" values, so as to reconstruct the original amplitude data page information.

In still another embodiment the present invention provides for reconstruction of the original data recorded as multiplexed phase data page holograms by implementing holographic interferometry during the read out process of said holograms.

A further advantage of the method and apparatus of the present invention is the ability to multiplex recorded holograms and search such holograms for content, in a manner such that the areal density of the holographically recorded information can be increased substantially as compared to conventional methods. This results in substantially higher capacity, higher data transfer rates, and higher speed data search.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7($b$) shows MATLAB simulation results of a Fourier transform of the data page shown in FIG. 7($a$).

FIG. 7($c$) shows MATLAB simulation results of Fourier transform of the data page in 0 and $\pi$ phase mode.

FIG. 9($a$) shows data page. FIG. 9($b$) shows an FT (magnified) of amplitude data page. FIG. 9($c$) shows FT (magnified) of phase data page, showing reduced DC peak.

FIGS. 10($a$) and 10($b$) show experimental results of edge detection method. FIG. 10($a$) shows holographic edge reconstruction of 4×4 pixel data page. FIG. 10($b$) shows holographic edge reconstruction of 8×8 pixel data page.

FIGS. 11($a$) through ($d$) show experimental results of interferometric recovery of data page. FIG. 11($a$) shows direct amplitude image (SLM in amplitude mode). FIG. 11($b$) shows data recovered through real-time interferometry. FIG. 11($c$) shows phase data page (SLM in phase mode), concentric circular rings and darkened annular region near periphery of image caused by interference effects associated with the cover glass of CMOS sensor. FIG. 11($d$) shows data recovered through double-exposure interferometry.

FIG. 12($a$) shows search result for blank page with SLM operating in phase mode; FIG. 12($b$) shows search result for 15$^{th}$ data page with SLM operating in amplitude mode for displaying data page search pattern, showing substantial cross correlations; FIGS. 12($c$)-($f$) Search result for 15$^{th}$ data page with SLM operating in phase mode for displaying search pattern for 100%, 75%, 50% and 25% of the content area of the 15$^{th}$ data page, respectively, showing near to zero cross correlations.

DETAILED DESCRIPTION OF THE INVENTION

A description of preferred embodiments of the invention follows.

The disclosed invention is an apparatus for holographic data storage (HDS) systems that comprises moderately to high numeric aperture components, such as one or more lenses and/or one or more mirrors, and a spatial light modulator (SLM) that is operable to be used in phase mode for the signal beam, said system operable to achieve moderate to high areal density of stored information, and said stored information comprising multiplexed holograms. The apparatus and method of this invention operates to achieve high areal density, defined as greater than about 25 bits/$\mu m^2$, with acceptable SNR, defined as SNR corresponding to a raw bit-error-rate (BER) of $\leq$10E-2, for stored information that comprises multiplexed holograms, and where acceptable SNR for information that is stored so as to be searchable corresponds to a BER can be >10E-2. A spatial light modulator operable in 0 and $\pi$ phase modes, or alternatively in other phase modes, is optionally provided during recording to substantially remove the dc peak from the Fourier transform (FT) at the recording plane (i.e. a plane where the holographic recording medium is disposed), thereby providing for homogenizing the amplitude distribution in said Fourier transform spectrum. A spatial light modulator operable in 0 and $\pi$ phase modes, or alternatively in other phase modes, is additionally provided so the HDS system can perform full or partial content addressable searching, and the acceptable raw BER of the holographically stored data for the apparatus and method of this invention can be greater than 10E-2 for said searching method.

Figure 1:
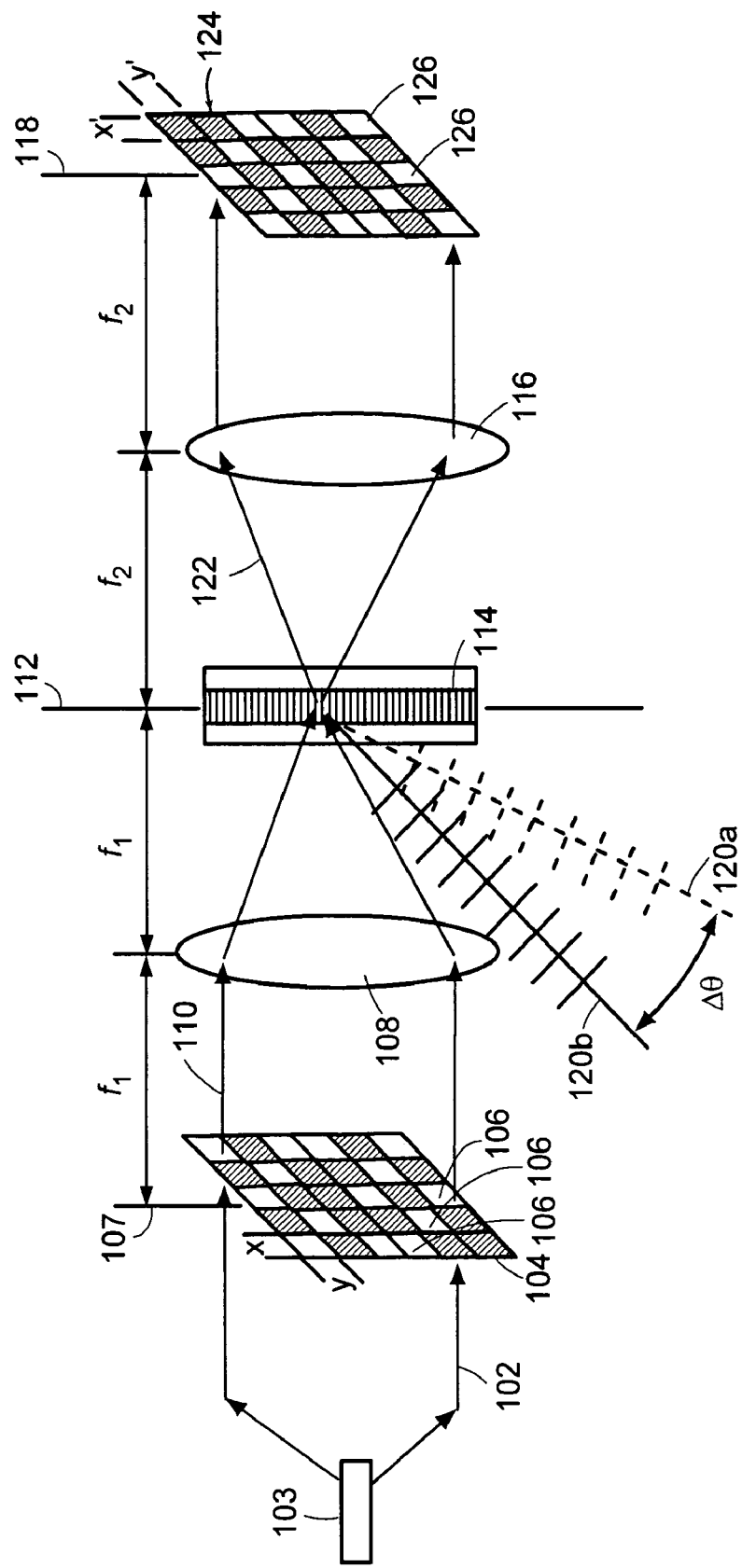
FIG. 1 shows a 4f optical system suitable for use in the present invention.
Figure 2:
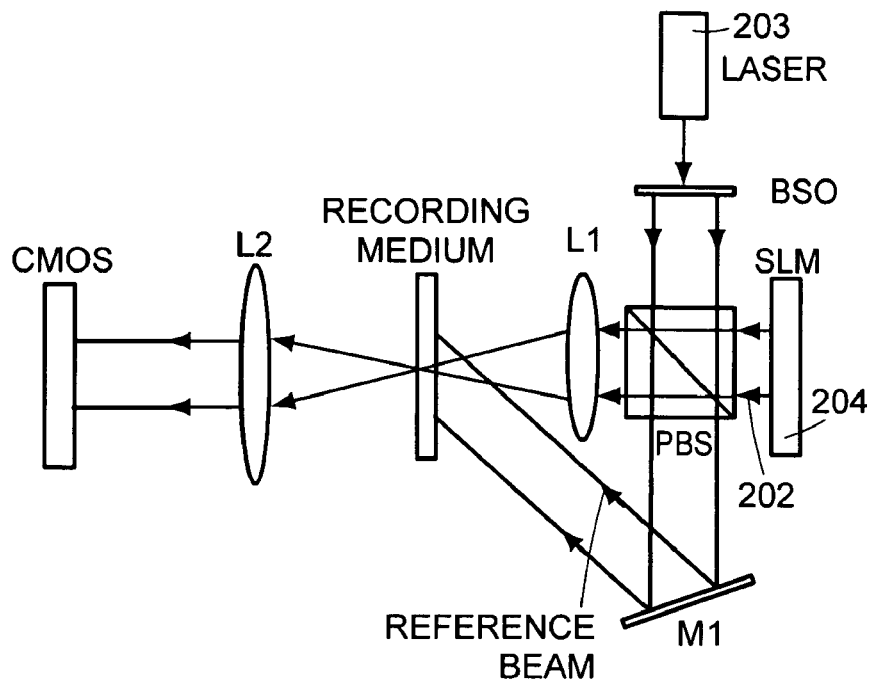
FIG. 2 shows an alternative embodiment of a 4f optical system suitable for use in the present invention.

FIG. 1 shows a 4f system suitable for using in the present invention. The signal beam 102, generated by a source 103 and beam shaping optics (BSO), passes through a spatial light modulator (SLM) 104, having a plurality of pixels 106, arranged in a two dimensional array. SLM 104 operates to encode signal beam 102 with data information that is to be recorded. SLM 104 can be operable in either an amplitude mode or a phase mode, as will be explained below in greater detail. Generally, SLMs can operate by transmission, as SLM 104 shown in FIG. 1, or by reflection, as shown in FIG. 2 for SLM 204. Referring to FIG. 1, plane 107 of SLM 104 is located at one focal length, $f_1$, from a first Fourier transform lens element 108, said lens having a large enough diameter (clear aperture) to accept the field of the light that diffracts or reflects from the SLM 104.

As used herein, the term "lens element" refers to one or more elements having optical power, such as lenses, that alone or in combination operate to modify an incident beam of light by changing the curvature of the wavefront of the incident beam of light. Lens element 108, for example, can comprise more than one lens.

In the 4f optical arrangement shown in FIG. 1, first Fourier transform lens element 108 operates to relay a 2-D Fourier transform of the spatial pattern of the SLM-encoded signal beam 110 to plane 112 (Fourier transform or focal plane) that is one focal distance f1 away from lens element 108 and, additionally, is two focal distances (2f1) from SLM 104.

Holographic recording material 114 can be located at or near plane 112.

A second Fourier transform lens element 116, having effective focal length f2, is positioned at a distance f2 from plane 112. In one embodiment, f2 can be equal to f1. Lens element L2 operates to perform a second Fourier transform, causing an inverted image of the spatial pattern of SLM 104 to appear at plane 118, which is one focal distance f2 behind second lens element 116. When reference beam 120a or 120b impinges upon the recorded hologram at an incident angle that was used to carry out recording of a hologram(s), then the light diffracted from the hologram(s) forms reconstructed optical beam 122, which passes into second lens element 116, is relayed to plane 118. In the embodiment where f1 is equal to f2, plane 118 is thus four focal distances f1 away from SLM 104. Plane 118 corresponds to the correlation plane at the detector array (light detector) 124. Light detector 124 has a plurality of pixels 126 that can be of the same or of different linear dimensions (x',y') as dimensions (x, y) of pixels 106 of SLM 104.

Figure 3:
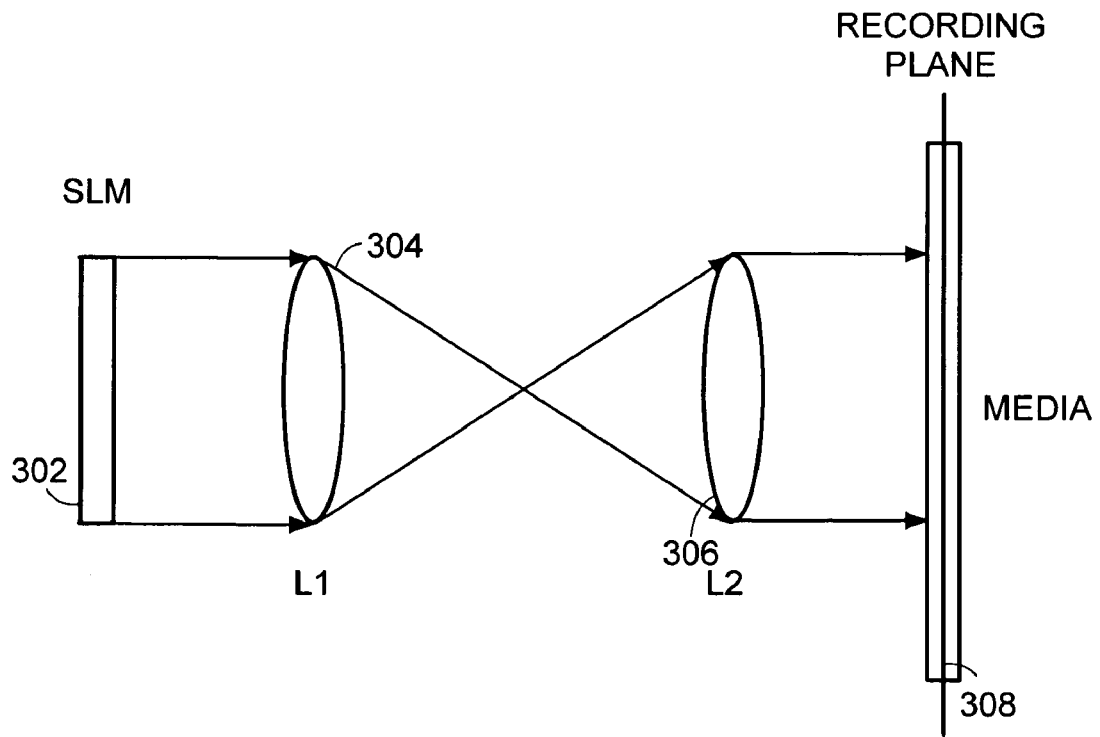
FIG. 3 shows an optical scheme used to record image plane holograms.
Figure 4:
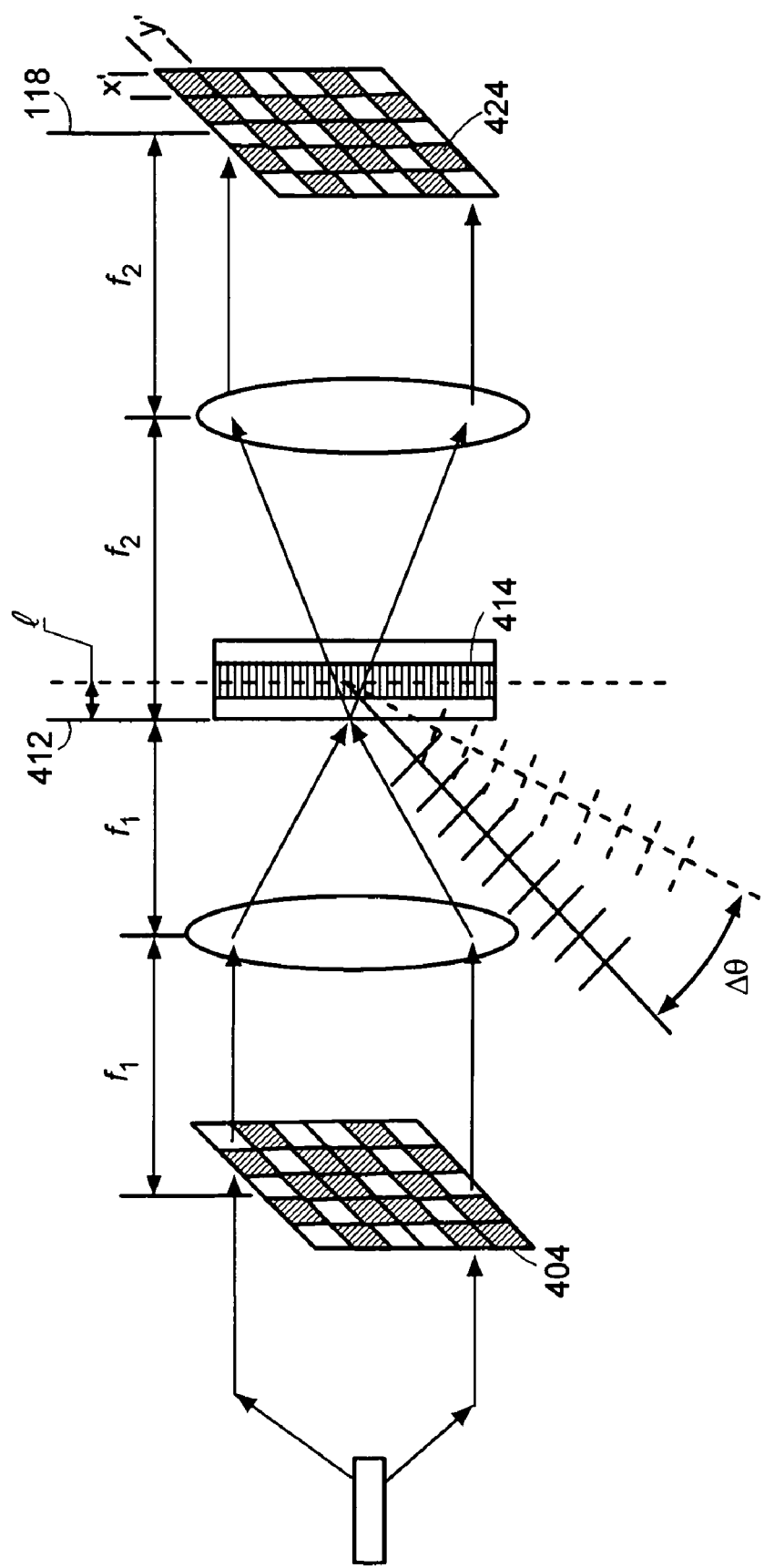
FIG. 4 shows an optical scheme used to record a fractional Fourier transform hologram.

Three types of hologram recording methods are distinguished based on the positioning of the recording media. In Fourier transform holograms, shown in FIG. 1, the media is placed at the focal plane (plane 112) of a lens element disposed in the path of the object beam encoded by an SLM. The other two types are image plane holograms and Fresnel zone holograms (also referred to as fractional FT holograms). Shown in FIG. 3, image plane holograms are recorded when SLM 302 is the first element in a 4f optical configuration which uses lens elements 304 and 306 to image a data page displayed on SLM 302 to holographic recording medium 308, which is the last element in the configuration. The third type of a holographic recording method, Fresnel zone or fractional FT plane holograms are shown in FIG. 4. In this scheme, holographic recording medium 414 is offset from Fourier transform plane 412 by a distance l. While any of the described methods can be used to record a hologram according to using methods and apparati of the present invention, the fractional FT method is preferred.

Principles of operation of SLM devices operable in amplitude mode and in phase mode will now be explained with references to FIG. 5 and FIG. 6, respectively.

A device referred herein as "spatial light modulator (SLM)" comprises a plurality of pixels onto which a light beam impinges and either reflects from the SLM (reflection-type SLM) or is transmits through the SLM (transmittal type SLM). (SLM 104 depicted in FIG. 1 is a transmittal-type SLM. FIG. 2 shows a reflection-type SLM 204.) SLMs contemplated can, by way of example, be one of the following: a nematic liquid crystal SLM, a twisted nematic liquid crytal SLM, a ferroelectric liquid crystal SLM, a cholesteric SLM, an SLM that uses arrays of photoelastic crystals for polarization modulation, an SLM that uses controllable micro gratings such as Silicon Light Machines Grating Light Valve (GLV) technology or a device that uses a means to dynamically control refractive or optical path length.

An example of an SLM suitable for use in the present invention is a ferroelectric liquid crystal (FLC) SLM, such as Lightcaster™ (1280×768 pixels) produced by Displaytech, Inc. The description of FIGS. 5 and 6 use an FLC SLM as a non-limiting example. One skilled in the art of holography will be readily able to adopt any other type of an SLM device for the purposes of the instant invention.

Figure 5:
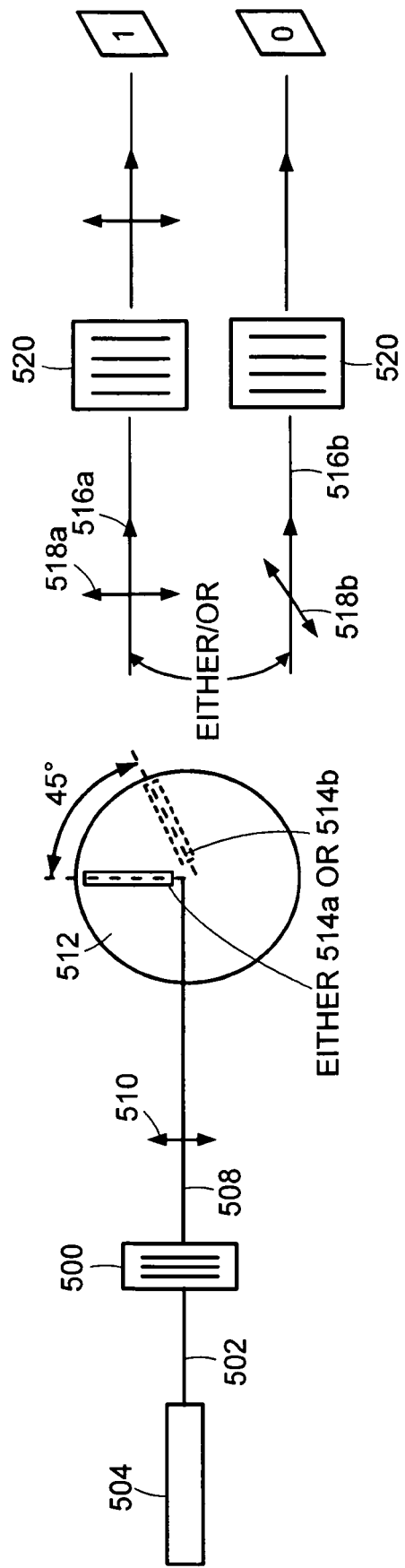
FIG. 5 is a schematic diagram of an amplitude mode of SLM operation.

Amplitude mode of operation is schematically depicted in FIG. 5. Coherent beam 502, produced by source 504 is passed through a linear polarizer 506 resulting in input beam 508 having polarization 510 (here, vertical). Each pixel 512 of the FLC SLM can have one of the two states of its constituent liquid crystals that orient said crystals 45 degrees apart, thereby forming FLC axes 514a and 514b, oriented at 45° angle. Even though both axes 514a and 514b are shown in FIG. 5, it should be understood that each pixel 512 can have its crystals oriented to form either axis 514a or axis 514b, but not both. Controllably applying voltage to each pixel changes its optical polarization properties by switching between liquid crystal states and thus FLC axes 514a and 514b.

As used herein, the term "optical polarization properties" refers to the ability of a material to change the direction of polarization of the light wavefront impinging onto such material and either reflected or transmitted through such material.

The SLM is positioned so that one of the two axes, here axis 514a, is oriented in a direction parallel to the direction of linear polarization 510 of the input beam 508. Upon being transmitted through, as shown in FIG. 5, or reflected from pixel 512, the direction of linear polarization 510 of the input beam 508 is rotated by twice the angle between the polarization axis and FLC axes 514a or 514b. In the example shown in FIGS. 5 and 6, the FLC SLM is a reflection type SLM. Accordingly, when input beam 508 is reflected from pixel 512, either output beam 516a, having linear polarization 518a (vertical), or output beam 516b, having linear polarization 518b (horizontal), is produced, depending on the state of each pixel 512. Thus rotation of polarization 510 is 0° when pixel 512 is in the state having axis 514a and 90° when pixel 512 is in the state having axis 514b.

Output beams 516a or 516b are then directed through linear polarizer 520, which transmits only the light from the pixels whose that has polarization direction coincided with that of linear polarizer 520. In the embodiment, where a reflection-type SLM is used, linear polarizer 520 and linear polarizer 506 can be one and the same. As a result, the observer sees either black (0) or illuminated (1) pixels depending on their state of polarization of each pixel.

The amplitude encoding scheme described above is a binary amplitude scheme. Other schemes can be used with the methods of the instant invention that use a "grey scale" of amplitude, whereby the amplitude detected by the light detected can vary continuously between zero and the amplitude of input beam 508.

Figure 6:
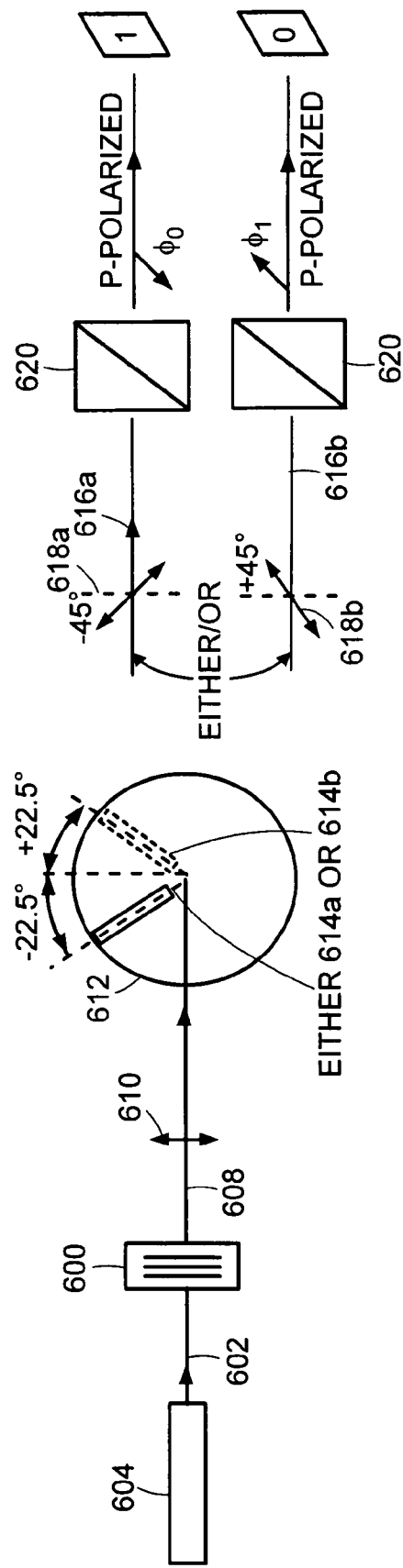
FIG. 6 is a schematic diagram of a phase mode of SLM operation.

Phase mode of operation of an SLM device is shown in FIG. 6.

Coherent beam 602, produced by source 604 is passed through linear polarizer 606 resulting in input beam 608 having polarization direction 610 (here, vertical).

The SLM is positioned so that one of the two axes, here axis 614a, is oriented at an angle −22.5° to the direction of linear polarization 610 of the input beam 608. Upon being reflected from pixel 612, as shown in FIG. 6, direction of linear polarization 610 of input beam 608 is rotated by twice the angle between the polarization axis and FLC axes 614a or 614b. Accordingly, when input beam 608 is reflected from pixel 612, either output beam 616a, having linear polarization 618a, or output beam 616b, having linear polarization 618b, is produced, depending on the state of each pixel 612.

Output beams 616a or 616b are then directed through polarizing element 620, which can be a polarizing beam splitter or a waveplate and thereby selects a polarization direction. Polarizing element 620, which, in the example of FIG. 6, is a polarizing beam splitter, transmits the p-polarized light (here, horizontally oriented) and reflects the s-polarized light (here vertically oriented). As a result, the observer after polarizing element 620 sees either the light having a phase of $\phi_0=0$ (reflected light from 620) or the light having the phase $\phi_1$ (transmitted light from polarizing element 620) that is different from $\phi_0=0$ by $+/-\pi/2$, depending on the state of each pixel, and thus the phase difference between light reflected from pixel 612 for the two states is $\pi$ for the light reflected by polarizing element 620.

The scheme described above refers to a phase encoding where a pair of phases $(0, \pi)$ are used. Other schemes can be employed, using pairs $(0, \phi=2\pi\times n/m)$, where n is a whole number or zero and m is a natural number.

In general, a binary data page used for holographic storage will be similar to a binary random image, due to the various modulation codes used while creating such a data page. When such a modulation coded binary digital data page with equal number of 0s and 1s is displayed on the phase SLM, and when its Fourier transform is, for example, obtained by a lens, destructive interference of fields at the dc region, from the 0 and $\pi$ pixels or other phase modes of the SLM leads to a Fourier spectrum with no dc peak.

Figure 7A:
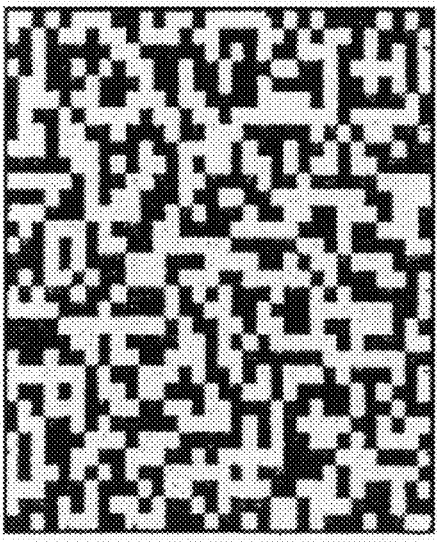
FIG. 7($a$) shows a representative amplitude modulated data page.
Figure 7B:
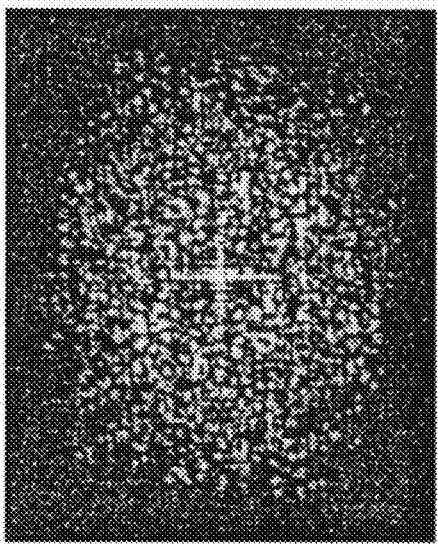
Figure 7C:
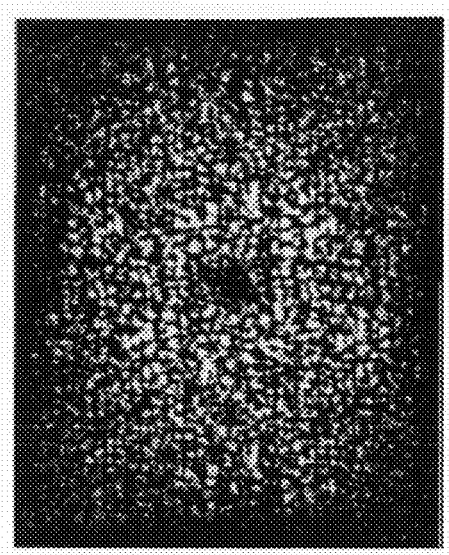

FIG. 7(*a*) shows a representative amplitude modulated data page. FIG. 7(*b*) shows MATLAB simulation results of a Fourier transform of the data page shown in FIG. 7(*a*). As seen in FIG. 7(*c*), the dc peak can be fully removed by using $(0, \pi)$ phase mode for representing binary data pages. Consequently, at the FT plane there is a substantially homogenized Fourier spectrum without the presence of the high intensity dc peak.

As used herein, the term "homogenized hologram" refers to a hologram recorded with a phase-modulated (encoded) object beam resulting in substantial removal of the DC peak from the Fourier transform at the recording plane that is at or near the Fourier transform plane, and hence homogenizing the amplitude distribution in said Fourier transform spectrum. In a preferred embodiment, a data page to be holographically recorded contains equal number of transparent or opaque pixels (when displayed by an SLM operating in amplitude mode) or equal number of pixels in each polarization state (when displayed by an SLM operating in phase mode).

However, when the data page is recorded with the SLM operable in the phase mode, the reconstructed data cannot be recovered directly by the standard application of the second Fourier transform to provide for imaging of the hologram diffraction onto the CCD or CMOS detector.

One embodiment of the present invention for recovery of data is herein referred to as the method of "edge detection". Conventionally, during the reconstruction of a hologram, the object beam arm is blocked and the hologram(s) is illuminated by the reference beam that was used to record the hologram. In one embodiment of the method and apparatus of this invention the hologram is read out by use of the reference beam in the conventional manner, with the object arm blocked. This method reconstructs the phase data page. However, since the dc peak was absent at the FT plane, holographic recording has occurred only for the ac components of the FT, and, consequently, said reconstruction provides only an "edge enhanced" reconstruction of the data page corresponding to the ac frequency components, as shown in FIGS. 10(*a*) and 10(*b*) for two levels of oversampling (SLM pixel size for data page is larger than detector pixel size), 4×4 and 8×8, respectively, which corresponds to transitions between pixels with difference phases. In one embodiment, the method and apparatus of this invention provides for recovery of data by use of a high-resolution detector that obtains the data from said edge enhanced image by identification of said transitions. Various means of identification of said transitions so as to recover the data are contemplated by the present invention. By way of example, a means of identification of said transitions can be assignment of the detected signal, located at the periphery of pixels, to a binary value of either 0 or 1 for the pixel. It is preferable to use over sampling in reconstruction and detection of the phase data pages, such that x/1 and y/1 pixels in the detector, where x and y are integers equal to two or greater, correspond to each pixel in the field of said optical encoding device, so as to provide for improved differentiation of said phase transitions. In cases where over sampling is not used, or in cases where the fill factor of the detector pixels is less than 100%, such as for high resolution detectors, then it is alternatively preferable to shift the detector by an amount, such as ½ of a pixel dimension in x or y directions, so as to provide for improved differentiation of said phase transitions. One experienced in the art will be able to choose the optimum shift amount for a particular detector. In an alternative embodiment the method and apparatus of this invention provides for detection of said edge-enhanced image and, additionally, for use of image processing for detection and analysis of edges and or lines, such as can perform edge extraction and/or edge contouring of digital images, which, by way of example, can be implemented using software available from Adobe Systems, Inc. or ArcSoft, Inc. or from vendors of machine vision software such as Cognex Corporation or Adept Technology, Inc., or other suitable image capture and analysis software that can perform analysis of the edge enhanced image by use of methods, that by way of example, can perform gradient edge enhanced detection preferably on a pixel level. In one embodiment of this method one or more fiducial markings, or otherwise known marking or pattern, recorded in the phase data page are used to determine a reference position for a "1" or "0" edge delineation in said reconstruction of the phase data page, and every other transition of phase change in the page is thereby assigned to the corresponding "1" or "0" binary value to provide for reconstruction of the original amplitude data page.

Various multiplexing methods, such as angular (planar angle or out-of-plane angle), spatioangular, azimuthal, shift (shift in-plane or shift out-of-plane), wavelength, phase-code, speckle, and related methods, as well as combinations thereof, are used to store multiple pages co-locationally within the same volume or in partially overlapping volumes.

Figure 8:
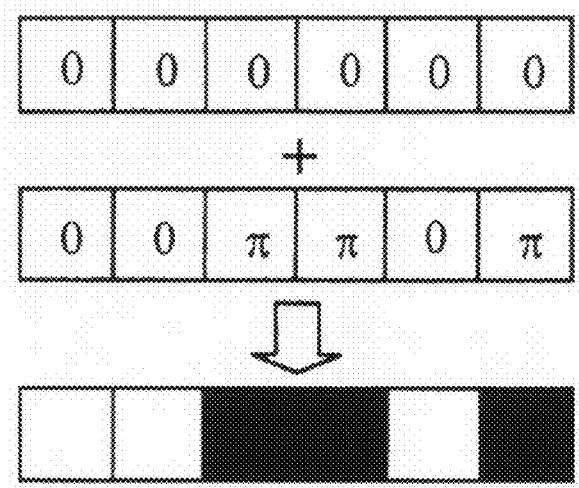
FIG. 8 is a schematic representation of a data recovery process that uses interferometry.

Another embodiment of the present invention for recovery of data is herein referred to as the method of Real-time holographic interferometry. The invention further provides for reconstruction of the original data recorded as multiplexed holograms by providing for holographic interferometry during the read out process. In one embodiment of the method of Real-time holographic interferometry of the present invention, the object beam is kept 'ON' during the illumination of the hologram by the reference beam during reconstruction of the stored data from a predetermined storage location. In this manner, the recorded object beam is reconstructed by the reference beam, said reconstruction containing a wavefront corresponding, by way of example, to the distribution of 0 and $\pi$ pixels or other phase modes of the optical encoding device used during recording. Concurrently, on the phase SLM or said optical encoding device, a uniform page (i.e. for example, all pixels in 0 phase mode or $\pi$ phase mode or other phase modes) is displayed and propagated to the stored data at the predetermined storage location. The new object beam from the phase SLM or said optical encoding device, which in a preferred embodiment is adjusted such that the intensity of this object beam is substantially equal to the intensity of the holographically reconstructed object beam obtained from illumination with the Reference beam, operates to form an interference pattern with the holographically reconstructed object beam at the common image plane on the CCD or CMOS detector. In this manner the reconstructed intensity pattern from the said interferometric method produces an image that corresponds to the original amplitude data page notwithstanding effects such as due to the bit error rate of the image. FIG. 8 depicts, by way of example, that 0 and 0 phase pixels produce constructive interference (binary 1) and 0 and π pixels produce destructive interference (binary 0). This embodiment of the present invention further produces better contrast in the recovered data page, because constructive interference gives 4 times the intensity.

Another embodiment of the present invention for recording and recovery of data is herein referred to as the method of Double exposure holographic interferometry. In this embodiment recording of a blank data page (i.e. full field super pixel), in addition to the recording of the phase data page, is carried out at or near the FT plane for each Reference beam condition used to multiplex holograms recorded co-locationally or substantially overlapped. When recording a blank data page, that is paired with a phase data page for each reference beam condition, it is preferable during recording of the blank data page to attenuate the dc component of the FT of the object beam such that its intensity is about equal to the intensity of the reference beam $[I_{obj}(DC)/I_{ref}]$~1 used during recording of the blank data page. Upon reconstruction with a selected Reference beam condition, the presence of the blank page hologram in combination with the phase page hologram provides for an interference of the two resultant diffraction wavefronts thereby providing for reconstruction of the original amplitude data page. It is preferable that the diffraction efficiency of each of the blank data page holograms would be substantially identical to that of each of the respective data page phase holograms that each is superimposed with, and, consequently, this method would preferably use an optimized recording schedule.

Still another embodiment of the present invention for recording and recovery of data is herein referred to as the method of Double reference beam interferometry. In said embodiment recording of a blank data page (i.e. full field super pixel) with a unique Reference beam condition is carried out at or near the FT plane, preferably with use of an attenuation of the dc component of the FT, as mentioned above, such that the ratio of $I_{obj}(DC)/I_{ref}$~1. The presence of this blank hologram among the overlapped mulitiplexed holograms provides for a diffraction wavefront, upon reconstruction with the correct reference beam, which can further provide for creating an interference pattern with the diffraction wavefronts from all of the other phase data pages. This embodiment thus requires use of two Reference beam conditions concurrently: one for the aforementioned blank page, and one for the selected phase data page that is to be reconstructed. Overlap of the two diffraction patterns so as to be substantially identical to when they were recorded is a required condition, so as to reconstruct the amplitude representation of the selected data page. The intensity of the reference beam for reconstruction of the blank data page can be adjusted relative to that of the reference beam used to reconstruct each of the data page phase holograms such that the diffracted intensities are substantially the same. The two reference beams at the time of readout need preferably to be in phase (0 or multiples of $2\pi$) as the diffracted beams of each travel in the same direction, and this, if needed, can be adjusted at the reconstruction events.

Other embodiments of the method and apparatus of this invention for recording and recovery of data are contemplated and as such the extent of the invention is not limited to the specifics described herein. By way of example, use of a shear plate that operates to provide an interference condition at a defined angle between a recovered wavefront and a sheared wavefront can provide for reconstruction of an amplitude image from which the original amplitude data page can be obtained.

Other embodiments of the method and apparatus of the present invention relate to Content address based data search. In one such embodiment holographic recording is carried out at the FT plane or fractional FT plane by conventionally displaying the data page on an SLM or other optical encoding device operating in the amplitude mode. In the present invention, content addressable searching is performed by displaying the search data patterns on an optical encoding device (SLM) that is operating in phase mode. Correlation matching is described, for example, in B. J. Goertzen and P. A. Mitkas, Opt. Engineering, Vol 35, No. 7, pp. 1847-1853 (1995) and G. W. Burr, S. Kobras, H. Hanssen, and H. Coufal, Appl. Optics, Vol. 38, No. 32, pp. 6779-6784 (1999) and G. W. Burr, SPIE, Vol. 5181, pp 70-84 (2003). In one embodiment, correlation matching comprises the steps of displaying a search pattern on the SLM in phase mode, relaying with a lens element an object beam comprising the phase search pattern to one or more recorded data page holograms in a storage location in the holographic recording medium and thereby illuminating the recorded holograms with said search object beam, and detecting a reconstructed diffracted reference beam from one or more data page holograms containing content of the search pattern, wherein the amount the amount of power in a diffracted reference beam is proportional to the degree of correlation between the input search pattern and the associated data page hologram. Advantageously, the inventive method of searching allows correlation matching when the size of the contiguous region of matched pixels is reduced from a fully matched data page to a smaller grouping of matched pixels. In this embodiment correlation matching can also be achieved for the case when the matched pixels in the search pattern are translated or rotated from their original location in either x or y directions. The amount of such translation or rotation of the search pattern depends on parameters such as thickness of the recording material, Bragg selectivity, multiplexing method, etc. and those experienced in the art will be able to determine appropriate conditions.

Another embodiment of the method and apparatus of the present invention also relates to Content address based data search. In this embodiment holographic recording is done at FT or fractional FT plane by displaying the data page on an SLM or other optical encoding device operating substantially in the phase mode, and content addressable searching is performed by displaying the selected search data pages or patterns on said optical encoding device that is also operating in phase mode and propagating the pattern in phase mode to the storage locations. In said embodiment, correlation matching can be readily and advantageously achieved when the size of the contiguous region of matched pixels is diminished from a fully matched data page to a smaller grouping of matched pixels that corresponds to less than about 50% of the total data page, more advantageously correlation matching can also be achieved when the area of said smaller grouping of matched pixels corresponds to less than about 10% of the total data page, and even more advantageously correlation matching can be achieved when the area of said smaller grouping of matched pixels corresponds to less than about 5% of the total data page. In said embodiment correlation matching can also be achieved for the case when the matched pixels in the search pattern have been translated or rotated from their original location in either x or y directions. The amount of such translation or rotation of the search pattern depends on parameters such as thickness of the recording material, Bragg selectivity, multiplexing method, etc. and those experienced in the art will be able to determine appropriate conditions.

Another embodiment of the method and apparatus of the present invention relates to Content address based data search as well as the manner in which hologram are multiplexed so as to achieve advantageously high areal density for stored information, high data rates, and high search rates. Information can be advantageously stored at high areal density in thin media so as to substantially mitigate geometric constraints that are encountered when the Reference beam is incident at an oblique angle.

Figure 13:
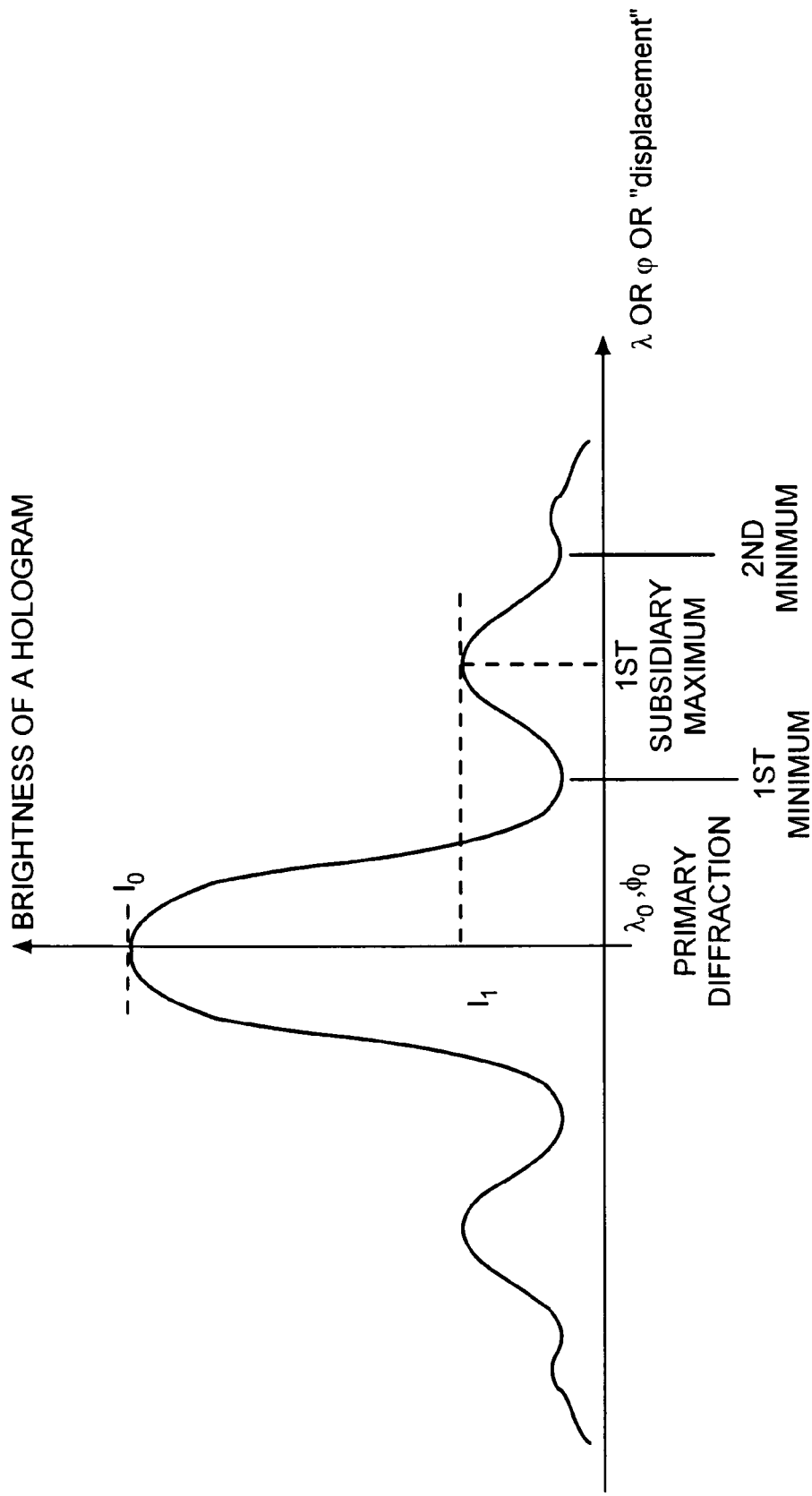
FIG. 13 is a representative angular or wavelength selectivity curve of a recorded hologram.

Referring to FIG. 13, the detected signal strength of the reconstructed object beam of a recorded hologram (I) varies with either the wavelength $\lambda$ of the reference beam used to reconstruct the hologram, or angle $\phi$ between such a reference beam and the optical axis of the object beam, said axis in this example being normal to the surface of the holographic recording medium according to the function depicted in FIG. 13. The curve shown in FIG. 13 is referred to as a Bragg selectivity (in this example angular or wavelength) or detuning curve for address-based retrieval. As shown in FIG. 13, the highest signal strength of the detected hologram is achieved at wavelength $\lambda_0$ or angle $\phi_0$ that correspond to the position of the primary or principal diffraction peak ($I_0$). The first subsidiary maximum (having intensity $I_1$) is separated from the primary diffraction by the $1^{st}$ null or minimum and is separated from the second subsidiary maximum by the $2^{nd}$ null or minimum. In one embodiment of the present invention, the an angle between reference beams used to record two or more multiplexed holograms is less than angular separation between a primary diffraction peak and the $1^{st}$ null of a holographic angle selectivity curve. In another embodiment, a difference in wavelength between reference beams used to record the multiplexed holograms is less than wave length separation between a primary diffraction peak and the $1^{st}$ null of a holographic wavelength selectivity curve. In still another embodiment, a difference in position used to record shift multiplexed holograms is less than the increment of position between a primary diffraction peak and the 1st null of a holographic shift selectivity curve.

In accordance with the present invention, the holograms are multiplexed co-locationally or substantially overlapped in a manner such that the angular or wavelength or positional increments for recording and/or recovering information from said holograms correspond to less than the respective increment between the primary diffraction peak and the first null or minima of the corresponding Bragg selectivity curve. Holograms recorded in this manner can be readily differentiated during content addressable search, described above, when the optical encoding device (SLM) is operable in phase mode. Preferably, said increment is significantly less than the increment between the primary diffraction peak and the first null of the Bragg selectivity curve, such as $\frac{1}{5}^{th}$ to about $\frac{1}{25}^{th}$ of the increment so as to provide for increasing the multiplexing factor (i.e. number of co-locationally multiplexed holograms or overlapped multiplexed holograms recorded across the diameter of one storage location) by at least a value of about 5 to 25. This improvement is at least comparable to the improved multiplexing factor that can otherwise be achieved by combining multiplexing methods, such as planar-angle and azimuthal or shift in tangential and shift in radial directions, but advantageously the opto-mechanical system for recording and/or reading would be simplified by comparison to what is required when combining multiplexing methods.

By way of example, for conventional planar-angle multiplexing of digital data pages an increment in angle of the reference beam for multiplexing is typically equal to the increment in angle between the primary diffraction peak and the second null or minima of the Bragg selectivity curve (see FIG. 13) so as to provide for reasonably good SNR. When a search of stored information is carried out with the SLM operable in phase mode, then this increment can be substantially reduced by a factor of 10 to 20 or more during recording of the multiplexed holograms, with limitations, by way of example, being the NA of the lens that may be used to redirect the ensemble of reference beams generated by the multiplexed holograms to a digital detector, the size and number of the detectors which by way of example can be photo diodes or CMOS detectors, distance between the detector(s) and the media, etc. A related aspect of this invention is that the areal density of the holographically recorded information can be increased substantially as compared to conventional methods and thereby advantageously provides for substantially higher capacity per unit thickness of the recording media, higher data rates, and higher speed data search. Another related aspect of the present invention is that the requirements for BER and SNR exhibited by the multiplexed holograms can be relaxed without compromising the operation of content addressable searching, and consequently the overhead associated with encoding the data with modulation codes and error correction codes can be reduced. The present invention provides for recording on the order of a terabytes of information in the form factor of a DVD and with a thin recording material that has a thickness of only about 400 microns. By the method of the present invention, raw optical search rates with disk media rotating, by way of example, at 1000 rpm can be on the order of at least about 100 Gbytes/sec.

EXEMPLIFICATION

EXAMPLE 1

RECODRING A HOMOGENIZED PHASE-ENCODED DATA PAGE AND READING THE RECORDED HOLOGRAM USING EDGE ENHANCED RECONSTRUCTION WITH 4× AND 8× OVERSAMPLING AT DETECTOR

Recording was carried out using a Coherent 315M DPSS laser emitting at 532 nm. A classical 4f optical configuration was implemented using spatially filtered coherent reference and signal beams and conventional doublets (f=70 mm) for all optics. Matched power densities were implemented for the signal and reference beams at the recording plane for recording carried out with a Displaytech ferroelectric LCD SLM (1280×768 pixels) in 0-pi phase mask conditions at Fourier Transform plane. The SLM can be operated in binary amplitude (0 and 1) as well as binary phase (0 and $\pi$) modes by rotation of the SLM by 22.5 degrees. Alternatively, amplitude and phase mode operations of the SLM were achieved by rotating a half-wave plate kept in front of it. During the binary phase mode operation the Displaytech SLM, in conjunction with the polarizing beam splitter in front of it, imparts $-\pi/2$ and $+\pi/2$ phase shifts on the light reflected from the pixels. A Photobit MV02 CMOS camera (512×512 pixels, 16 µm pixel pitch) was used as the detector device. Aprilis CROP photopolymer material of 50 µm to 400 µm thickness was used as the holographic recording medium.

Figure 9A:
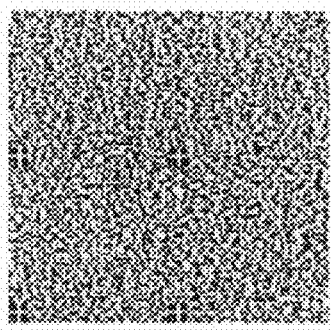
FIGS. 9($a$) through 9($c$) show experimental results of DC-removed Fourier transform (FT) of a data page.
Figure 9B:
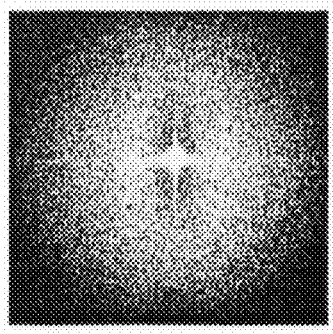
Figure 9C:
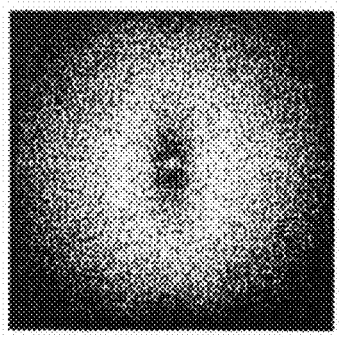

A balanced (i.e. having a substantially equal number of the opaque and transparent pixels) 6-8 modulation coded binary data page comprising regularly spaced fiducial markings was displayed on the SLM. FIG. 9(a) shows a part of said data page with said pixel grouping for an example of said fiducial marking. FIG. 9(b) shows the Fourier power spectrum as captured by the CMOS camera when it was positioned at the FT plane, for the case when the SLM is operated in the amplitude mode. The presence of the high intensity dc peak at the center, as seen in FIG. 9(b) typically requires that the recording take place at a plane that is either in front of or is behind the exact FT plane, or some other beam conditioning technique may be employed. FIG. 9(c) shows the Fourier power spectrum as captured by the CMOS camera when it was positioned at the FT plane, for the case when the SLM is operated in the 0-π phase mode. FIG. 9(c) shows that the high intensity dc peak is substantially absent, due to the destructive interference between the light from 0 and π pixels of the SLM when a balanced binary data page is presented to said SLM.

After displaying the data page on said SLM operating in phase mode, a hologram is recorded in the photopolymer material which is positioned at the FT plane. When the hologram is read-out in the conventional manner by the reference beam, with the object arm being blocked, the resultant reconstruction is the phase data page. The dc peak, however, was absent at the FT plane, as holographic recording occurred only for the ac components of the Fourier spectrum. The resultant reconstruction is thus an edge enhanced reconstruction of the data page exhibiting the phase transitions, as shown in FIGS. 10(a) and 10(b) for the case of 4×4 and 8×8 over sampling, respectively, on the binary data page presented to the SLM. If the value of "0" or "1" is known for any specific pixel location in the reconstructed data page, such as would be the case for known fiducial markings, then by edge detection means every pixel can be assigned to a "0" or "1" and, accordingly, the original data page can be reconstructed.

EXAMPLE 2

RECONSTRUCTION OF AN AMPLITUDE DATA PAGE BY INTERFERENCE OF THE RECONSTRUCTED PHASE-MODULATED DATA PAGE AND AN IMAGED UNIFORM PAGE DISPLAYED ON THE SLM

When the phase hologram is recorded as in Example (1) then reconstruction of the original amplitude data page from the phase image is accomplished by using a real-time holographic interferometric method. In one embodiment, a blank (uniform) page is displayed on the phase SLM. With the object beam being kept 'ON', the data page hologram was read-out by concurrent illumination with the reference beam using the correct reference beam angle for said data page hologram. As shown in FIG. 8, interference between the holographically reconstructed data page and the blank (uniform) page from the SLM reproduces the original data page, shown in FIG. 11(a), in amplitude mode for detection by the CMOS camera. The recovered data page as captured by said CMOS camera of Example (1) is shown in FIG. 11(b). FIG. 11(c) shows the phase image as captured directly by said CMOS camera without the recording material at the FT plane.

EXAMPLE 3

RECONSTRUCTION OF AN AMPLITUDE DATA PAGE BY INTERFERENCE OF THE RECONSTRUCTED PHASE-MODULATED DATA PAGE AND A BLANK CO-LOCATIONALLY RECORDED PAGE

When the phase hologram is recorded so as to use the method of Double exposure holographic interferometry for data recovery, a blank data page (i.e. full field super pixel), in addition to the recording of the phase data page, was carried out near the FT plane. Upon reconstruction with the Reference beam, the presence of the blank page hologram in combination with the phase page hologram provided for an interference of the two resultant diffraction wavefronts thereby providing for reconstruction of the original amplitude data page as shown in FIG. 11(d).

EXAMPLE 4

DEGREE OF CORRELATION MATCHING FOR SEARCH PATTERN HAVING 100% OF THE AREA OF THE DATA PAGE VERSUS 0% OF THE AREA OF THE DATA PAGE FOR MULTIPLEXED DATA PAGE FT AND FRACTIONAL FT HOLOGRAMS RECORDED IN BINARY VERSUS AMPLITUDE MODE WITH HIGH AND LOW MODULATION DEPTH

The extent of correlation matching was evaluated for holograms recorded with several different types of recording conditions. The ratio of the intensity of the Reference beam reconstruction was determined when using a fully matched data page presented to the SLM versus 15 different non-matched data pages that were similarly presented to said SLM. Each of the 15 different non-matched data pages comprised a balanced random distribution of (1s) and (0s) to simulate a standard data page. Poor correlation matching was achieved and significant cross correlation was exhibited when one data page was recorded with the Displaytech SLM operated in amplitude mode and with the recording material positioned at a distance of about 10% behind the Fourier Transform plane. When multiple (15 to 30) amplitude data pages were multiplexed with planar angle multiplexing at the Fourier Transform plane then good correlation matching was exhibited and cross correlation was nominal.

In case (i) FT plane recording of a data page was carried out with said Displaytech LCD SLM operating in 0-π phase conditions using the setup of Example (1), and the recording material (400 microns thick Aprilis CROP photopolymerizable material) was positioned at the Fourier Transform plane. The incident power densities of the reference and signal beams were matched at the recording plane.

In case (ii) FT plane recording of a data page was carried out with said Displaytech LCD SLM operating in amplitude mode using the setup of Example (1), and the recording material (400 microns thick Aprilis CROP photopolymerizable material) was positioned at the Fourier Transform plane. The incident power densities of the reference and dc portion of the signal beams were matched at the recording plane.

In case (iii) FT plane recording of a data page was carried out with said Displaytech LCD SLM operating in amplitude mode using the setup of Example (1), and the recording material (400 microns thick Aprilis CROP photopolymerizable material) was positioned at the Fourier Transform plane. The incident power densities of the reference and signal beams were mismatched at the recording plane such that $I_{Ref}/I_{ACmax}=1$ where $I_{AC}$ is the intensity distribution of the ac components of the FT of the object beam. Accordingly, high modulation depth was achieved for holographic recording of the ac components, and low modulation depth for the DC component. This approach is opposite to the conventional method where the intensity of the Reference beam is typically much greater than $I_{AC}$ in order to achieve good fidelity for the recorded data page.

In case (iv) fractional FT plane recording of a data page was carried out with said Displaytech LCD SLM operating in amplitude mode using the setup of Example (1), and the recording material (400 microns thick Aprilis CROP photopolymerizable material) was positioned at a distance equal to about 10% of the focal distance behind the Fourier Transform plane. The incident power densities of the reference and the average of the signal beams were approximately matched at the recording plane.

In case (v) fractional FT plane recording of a data page was carried out with said Displaytech LCD SLM operating in 0-π phase mode using the setup of Example (1), and the recording material (400 microns thick Aprilis CROP photopolymerizable material) was positioned at a distance equal to about 10% of the focal distance behind the Fourier Transform plane. The incident power densities of the reference and signal beams were matched at the recording plane.

Results for the ratio of the intensity of the Reference beam reconstruction using the matched data page at the SLM versus 15 different non matched data pages comprising a balanced random distribution of (1s) and (0s) were as follows.

Case (i)

Intensity ratio=(80-82)/(2.1-2.5) where correlation with each of the 15 non matched data pages results in a small variation in the dc signal strength but in each case the dc level is substantially diminished relative to the value achieved for the matched data page. This ratio should only be limited by diffraction efficiency of the recorded data page. By way of example, for larger diffraction efficiency a ratio of 148/0.5 was achieved.

Case (ii)

Intensity ratio=(62)/(60) where correlation with each of the 15 non-matched data pages results in a small variation in the dc signal strength but in each case the dc level is substantially similar to the value achieved for the matched data page.

Case (iii)

Intensity ratio=(53)/(5.35) where correlation with each of the 15 non-matched data pages results in a small variation in the dc signal strength but in each case the dc level is moderately diminished relative to the value achieved for the matched data page.

Case (iv)

Intensity ratio=(97)/(20-22) where correlation with each of the 15 non-matched data pages results in a small variation in the dc signal strength but in each case the dc level is moderately diminished relative to the value achieved for the matched data page.

Case (v)

Using 0-pi phase and a shift of the media position to 10% of focal length behind FT plane; Intensity ratio=(60)/(0.9-1.1) where correlation with each of the 15 non-matched data pages results in a small variation in the dc signal strength but in each case the dc level is again substantially diminished relative to the value achieved for the matched data page.

EXAMPLE 5

CORRELATION SIGNAL STRENGTH RELATES TO CONTIGUOUS AREA FOR SEARCH PATTERN RELATIVE TO 100% OF THE AREA OF A DATA PAGE

The size of the contiguous region of matched pixels of the data page in a content addressable search correlates with the magnitude of the intensity ratio of the correlation for the case when the total number of matched pixels is kept constant for case (i) of Example 4. For example, when the contiguous region of matched pixels is 50% of the width of the whole data page and along the entire length of the data page (i.e. 50% of the area is matched from left to right), independent of where the 50% matched portion is positioned horizontally along the full data page, then the intensity ratio of the correlation is diminished from 56/1.2 observed for a fully matched data page to 25/1.2. When the contiguous region of matched pixels that is equal to 50% of the width of the entire data page, however, is split into two regions oriented along the entire length of two opposing edges of the data page, and these are separated by a center region of random pixels extending along the entire length and equal to about 50% of the total pixels of the data page, then the intensity ratio of correlation is diminished further to a value slightly larger than when 25% of the data page is matched in a contiguous region.

EXAMPLE 6

IMPROVED DISCRIMINATION FOR PHASE CONTENT SEARCH OF BALANCED CO-LOCATIONAL BINARY AMPLITUDE DATA PAGES, MULTIPLEXED WITH ANGLE INCREMENTS LESS THAN THE ANGLE DIFFERENCE BETWEEN THE PRIMARY DIFFRACTION PEAK AND FIRST MINIMA, COMPARED TO AMPLITUDE SEARCH OF BALANCED CO-LOCATIONAL BINARY AMPLITUDE DATA PAGES

Figure 12B:
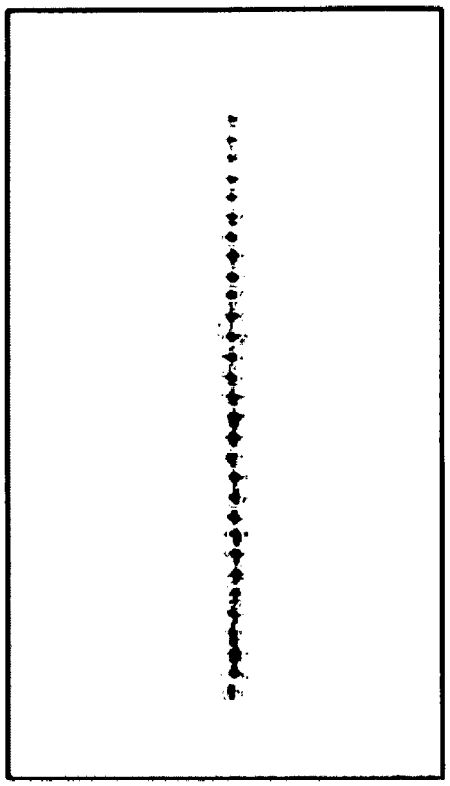
FIGS. 12($a$) through ($f$) show the Results of "content addressed" search for holographic recording of thirty (30) binary data pages with an SLM operated in either phase mode during recording as shown in FIG. 12($a$) or amplitude mode as shown in FIGS. 12($b$) and ($c$)-($f$).
Figure 12A:
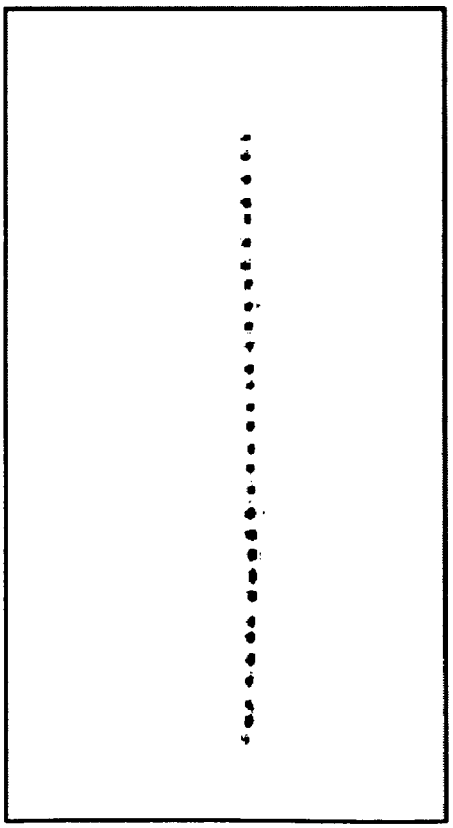

The effect of the size of the contiguous region of matched pixels of the data page in a content addressable search was additionally examined for the case of having recorded multiplexed amplitude data pages where each page was a balanced random encoded binary page and multiplexing was carried out at less than Bragg selectivity conditions for both amplitude and phase recording. Thirty (30) 262 kbit substantially phase data pages were multiplexed co-locationally using planar angle multiplexing with an angle increment of the Reference beam that was reduced to about ⅕ of the full width half height of the Bragg detuning curve, corresponding to 10 times denser than with conventional planar-angle multiplexing. In another location, thirty (30) 262 kbit amplitude data pages were multiplexed co-locationally using planar angle multiplexing with an angle increment of the Reference beam that was reduced to about ⅓ of the full width half height of the Bragg detuning curve, corresponding to 6 times denser than with conventional planar-angle multiplexing. The holograms were recorded using the optical configuration of FIG. 2, as described in Example (1), and exposure times were scheduled to achieve similar diffraction efficiency for each multiplexed data page. Content addressable searching of the co-locational amplitude data pages was implemented firstly with the search pattern presented to the SLM in substantially phase mode for the case when the angle increment was reduced to provide for a factor of 10 times the conventional density, and, secondly, in amplitude mode for the case when the angle increment was reduced to provide for a factor of 6 times the conventional density. The search pattern for FIG. 12(*a*) corresponded to a blank page presented to the SLM operating in phase mode. The entire ensemble of reconstructed Reference beams is exhibited for the 30 multiplexed holograms that were recorded at 10 times conventional density, due to the residual dc component that was present as a consequence of the SLM not being operated fully in phase mode. The search pattern for 8(*b*) was in amplitude mode and corresponded to one fully matched page out of the 30 that were co-locationally multiplexed in amplitude mode. FIG. 12(*b*) shows substantial cross correlation and nominal differentiation in the intensity of the reconstructed Reference beams. Thirdly, content addressable searching of the co-locational amplitude data pages was implemented with the search pattern presented to the SLM in phase mode. The search pattern again corresponded to one fully matched page out of the 30 that were co-locationally multiplexed. FIG. 12(*c*) shows negligible evidence of cross correlation and correct identification of the Reference beam corresponding to the data page of the matched search data.

Figures 12C, 12D, 12E, 12F:
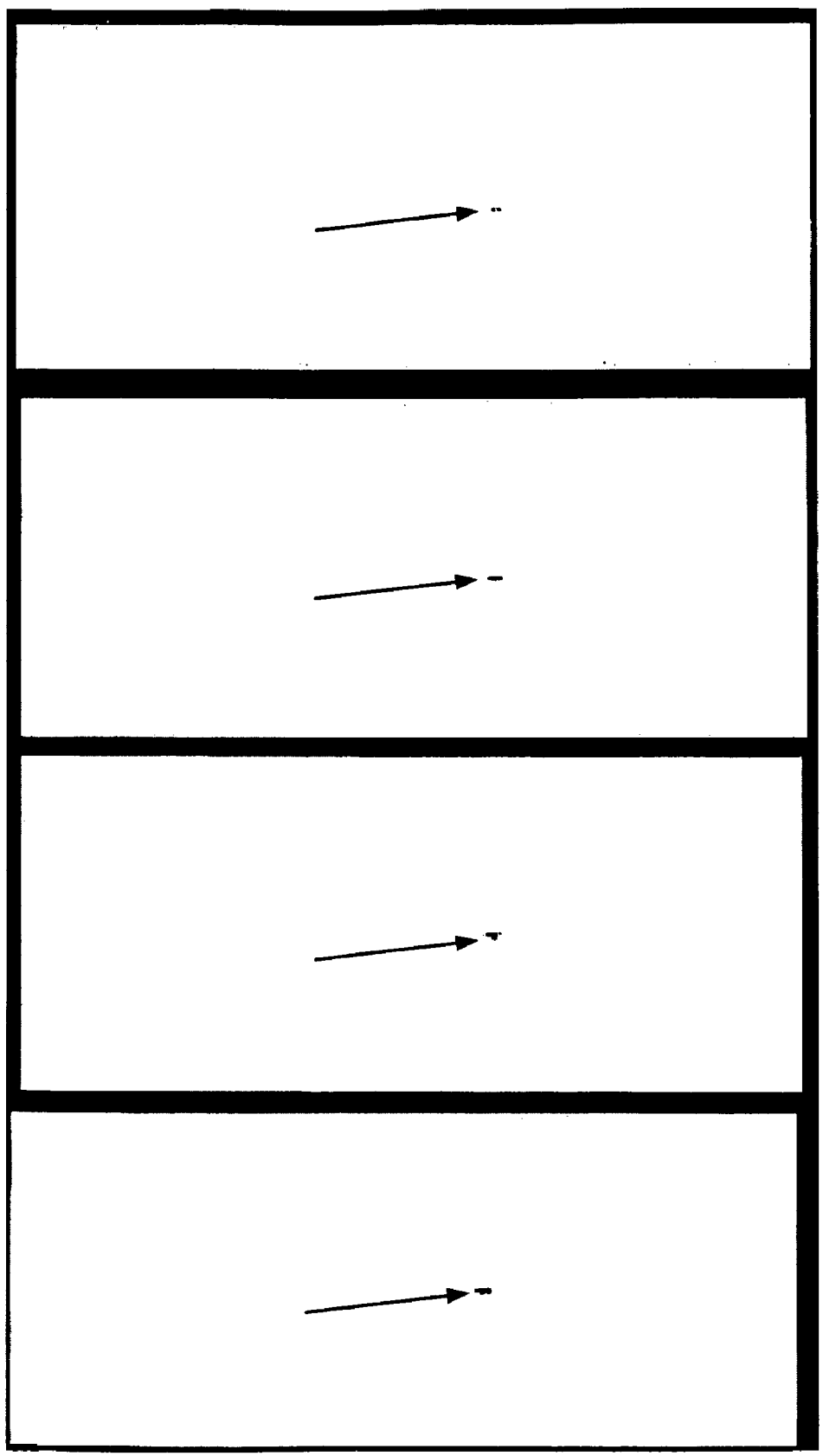

Additionally, content addressable searching of the co-locational amplitude data pages was implemented with the search pattern presented to the SLM in phase mode, but with the search data being reduced to 75%, 50%, and 25% of the fully matched data page for one of the co-locationally multiplexed data pages. FIGS. 12(d), 12(e) and 12(f) show correlation matching for the 75%, 50%, and 25% cases, respectively, and also exhibit negligible evidence of cross correlation.

EXAMPLE 7

DEGREE OF CORRELATION MATCHING FOR MULTIPLEXED PHASE DATA PAGE WHEN THE AREA OF THE CONTIGUOUS SEARCH PATTERN IS VARIED BETWEEN 100% And ABOUT 5% OF THE AREA OF THE DATA PAGE

The degree of correlation matching was determined for a phase data page recorded with conditions of case (i) of Example (3) when the contiguous grouping of matched pixels used for a content addressable search by the method of Example (3) was varied between about 5.45% and 100% of the total data page area.

When about 30×550 out of $550^2$ pixels (i.e. 5.45%) of original area of the page is matched in a contiguous region, and the remaining ~94.5% of the page is unmatched and is, additionally, randomly distributed maintaining the balanced modulation code, the intensity ratio of the correlation declined to a value of about 3/1.2, as compared to 56/1.2 for a fully matched area.

When about 60×550 out of $550^2$ pixels (i.e. 10.9%) of original area of the page is matched in a contiguous region, and the remaining ~89% of the page is unmatched and is, additionally, randomly distributed maintaining the balanced modulation code, the intensity ratio of the correlation declined to a value of about 6.8/1.2, as compared to 56/1.2 for a fully matched area.

When about 120×550 out of $550^2$ pixels (i.e. 21.8%) of original area of the page is matched in a contiguous region, and the remaining ~78% of the page is unmatched and is, additionally, randomly distributed maintaining the balanced modulation code, the intensity ratio of the correlation declined to a value of about 16/1.2, as compared to 56/1.2 for a fully matched area.

When about 50% of original area of the page (i.e. 225×550 pixels in both directions) is matched in a contiguous region, and the remaining 50% of the page is unmatched and is, additionally, randomly distributed maintaining the balanced modulation code, then the intensity ratio of the correlation decreased from the fully matched value of 56/1.2 to 25/1.2.

When about 320×550 out of $550^2$ pixels (i.e. 58.2%) of original area of the page is matched in a contiguous region, and the remaining ~42% of the page is unmatched and is, additionally, randomly distributed maintaining the balanced modulation code, the intensity ratio of the correlation declined to a value of about 40/1.2, as compared to 56/1.2 for a fully matched area.

When about 420×550 out of $550^2$ pixels (i.e. 76.4%) of original area of the page is matched in a contiguous region, and the remaining ~23.6% of the page is unmatched and is, additionally, randomly distributed maintaining the balanced modulation code, the intensity ratio of the correlation declined to a value of about 49/1.2, as compared to 56/1.2 for a fully matched area.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of recording multiplexed holograms, comprising:
    recording a first phase-encoded Fourier transform hologram or a fractional Fourier transform hologram with a first reference beam; and
    recording a second phase-encoded Fourier transform hologram or a fractional Fourier transform hologram with a second reference beam at the same location or at a substantially overlapped location on a holographic recording medium,
    wherein the angle between the first and the second reference beams is less than the angular separation between the primary diffraction peak and the first minimum of the Bragg angle selectivity curve of the first or the second holograms.

2. The method of claim 1, wherein the angular separation of the first and the second reference beam is less than about 1/10 of the angular separation between the primary diffraction peak and the first minimum of the Bragg angle selectivity curve of the first or the second holograms.

3. A method of recording multiplexed holograms, comprising:
    recording a first phase-encoded Fourier transform hologram or a fractional Fourier transform hologram with a first wavelength; and
    recording a second phase-encoded Fourier transform hologram or a fractional Fourier transform hologram with a second wavelength at the same location or at a substantially overlapped location on a holographic recording medium
    wherein the difference between the first and the second wavelengths is less than the wavelength separation between the primary diffraction peak and the first minimum of the Bragg wavelength selectivity curve of the first or the second holograms.

4. The method of claim 3, wherein the wavelength separation of the first and the second holograms is less than about 1/10 of the wavelength separation between the primary diffraction peak and the first null of the Bragg wavelength selectivity curve of the first or the second holograms.

5. A method of recording multiplexed holograms, comprising:
    recording a first Fourier transform hologram or a fractional Fourier transform hologram with a first reference beam; and
    recording a second Fourier transform hologram or a fractional Fourier transform hologram with a second reference beam at the same location or at a substantially overlapped location on a holographic recording medium,
    wherein either the difference in angle or the difference in wavelengths between the first and second reference beams is less than either the angular separation or wavelength separation, respectively, between the primary diffraction peak and the first minimum of a Bragg selectivity curve of the first or the second holograms.

6. The method of claim 5, wherein the angle between the first and second reference beams is less than the angular separation between the primary diffraction peak and the first minimum of the Bragg angle selectivity curve of the first or the second hologram.

7. The method of claim 6, wherein the angular separation of the first and second reference beam is less than about 1/4th of the angular separation between the primary diffraction peak and the first minimum of the Bragg angle selectivity curve of the first or the second hologram.

8. The method of claim 6 wherein the recorded multiplexed holograms are phase encoded data pages.

9. The method of claim 6, wherein the angular separation of the first and second reference beam is less than about $\frac{1}{10}$th of the angular separation between the primary diffraction peak and the first minimum of the Bragg angle selectivity curve of the first or the second hologram.

10. The method of claim 5, wherein the first and second reference beams are at first and second wavelengths, respectively, and wherein the wavelength difference between the first and second wavelengths is less than the wavelength separation between the primary diffraction peak and the first minimum of the Bragg wavelength selectivity curve of the first or the second hologram.

11. The method of claim 10 wherein the recorded multiplexed holograms are phase encoded data pages.

12. The method of claim 10, wherein the wavelength separation of the first and second hologram is less than about $\frac{1}{4}$th of the wavelength difference between the primary diffraction peak and the first minimum of the Bragg wavelength selectivity curve of the first or the second hologram.

13. The method of claim 10, wherein the wavelength separation of the first and second hologram is less than about $\frac{1}{10}$th of the wavelength difference between the primary diffraction peak and the first minimum of the Bragg wavelength selectivity curve of the first or the second hologram.

* * * * *